United States Patent
Lin

(10) Patent No.: US 7,643,313 B2
(45) Date of Patent: Jan. 5, 2010

(54) POWER CONVERTER FOR COMPENSATING MAXIMUM OUTPUT POWER AND PWM CONTROLLER FOR THE SAME

(75) Inventor: Chien-Yuan Lin, Taipei (TW)

(73) Assignee: System General Corporation, Taipei (TW)

( * ) Notice: Subject to any disclaimer, the term of this patent is extended or adjusted under 35 U.S.C. 154(b) by 212 days.

(21) Appl. No.: 12/024,732

(22) Filed: Feb. 1, 2008

(65) Prior Publication Data

US 2008/0291701 A1    Nov. 27, 2008

Related U.S. Application Data

(60) Provisional application No. 60/939,552, filed on May 22, 2007.

(51) Int. Cl.
*H02M 3/335* (2006.01)
(52) U.S. Cl. ............... 363/20; 363/21.01; 363/21.1; 363/21.18
(58) Field of Classification Search ............ 363/20, 363/21.01, 21.04, 21.1, 21.11, 21.12, 21.18
See application file for complete search history.

(56) References Cited

U.S. PATENT DOCUMENTS

| 6,862,194 | B2 * | 3/2005 | Yang et al. | 363/16 |
| 6,977,824 | B1 * | 12/2005 | Yang et al. | 363/21.16 |
| 7,016,204 | B2 * | 3/2006 | Yang et al. | 363/21.13 |
| 7,061,780 | B2 * | 6/2006 | Yang et al. | 363/21.16 |
| 7,088,598 | B2 * | 8/2006 | Yang et al. | 363/21.01 |
| 7,259,972 | B2 * | 8/2007 | Yang | 363/21.16 |
| 7,362,592 | B2 * | 4/2008 | Yang et al. | 363/21.13 |
| 2006/0056204 | A1 * | 3/2006 | Yang et al. | 363/10 |
| 2007/0109821 | A1 * | 5/2007 | Yang | 363/21.04 |

* cited by examiner

*Primary Examiner*—Bao Q Vu

(57) ABSTRACT

A PWM controller compensates a maximum output power of a power converter, and includes a PWM unit and a compensation circuit. The PWM unit generates a PWM signal for controlling a power switch to switch a power transformer, which has a primary winding connected to the power switch and is supplied with an input voltage of the power converter. A pulse width of the PWM signal is correlated to an amplitude of the input voltage. The compensation circuit generates a current boost signal in response to the PWM signal by pushing up a peak value of a current-sense signal generated by a current-sense device in response to a primary-side switching current of the power transformer. A peak value of the current boost signal is adjusted by the pulse width of the PWM signal for compensating a difference of the maximum output power caused by the amplitude of the input voltage.

12 Claims, 4 Drawing Sheets

POWER CONVERTER FOR COMPENSATING MAXIMUM OUTPUT POWER AND PWM CONTROLLER FOR THE SAME

CROSS-REFERENCE TO RELATED APPLICATION(S)

This application claims the benefit of U.S. Provisional Patent Application Ser. No. 60/939,552 filed May 22, 2007, and the subject matter thereof is hereby incorporated herein by reference thereto.

FIELD OF THE INVENTION

The present invention relates to power converters, and more particularly, to a power converter used for compensating a maximum output power.

BACKGROUND OF THE INVENTION

Power converters are generally used to power many of electronic devices. The pulse-width modulation (PWM) technique is a conventional technique used in a power converter to control and regulate the output power. Various protection functions are built-in in the power converter to protect the power converter from permanent damage. The function of compensating the maximum output power is commonly used for overload and short-circuit protections.

FIG. 1 shows a traditional power converter. The power converter includes a power transformer $T_1$ having a primary winding $N_P$ and a secondary winding $N_S$. The power transformer $T_1$ is to provide galvanic isolation between AC line input and an output of the power converter for safety. The primary winding $N_P$ is supplied with an input voltage $V_{IN}$ of the power converter. In order to regulate an output voltage $V_O$ of the power converter, a control circuit coupled in series with the primary winding $N_P$ of the power transformer $T_1$ generates a PWM signal $V_{PWM}$ in response to a feedback signal $V_{FB}$. The control circuit comprises an oscillator 10, a first comparator 31, a second comparator 32, a logic circuit 33, and a flip-flop 20. The PWM signal $V_{PWM}$ controls a power switch $Q_1$ to switch the power transformer $T_1$. A current-sense resistor $R_S$ is connected in series with the power switch $Q_1$ to determine the maximum output power of the power converter. The current-sense resistor $R_S$ turns the switching current of the power transformer $T_1$ into a current-sense signal $V_S$. The current-sense signal $V_S$ is coupled to the control circuit. If the current-sense signal $V_S$ is greater than a maximum threshold $V_M$ through the first comparator 31, the control circuit is coupled to disable the PWM signal $V_{PWM}$, and it also restricts the maximum output power of the power converter.

FIG. 2 shows the signal waveforms of the PWM signal $V_{PWM}$ and the current-sense signal $V_S$ of the power converter in FIG. 1. As the PWM signal $V_{PWM}$ becomes logic-high, a primary-side switching current $I_P$ will be generated accordingly. A peak value $I_{P1}$ of the primary-side switching current $I_P$ can be given by, $$I_{P1} = \frac{V_{IN}}{L_P} \times T_{ON} \qquad (1)$$

The maximum output power $P_O$ can be expressed by, $$P_O = \frac{L_P}{2 \times T_S} \times I_{P1}^2 = \frac{V_{IN}^2 \times T_{ON}^2}{2 \times L_P \times T_S} \qquad (2)$$

In Equations (1) and (2), $L_P$ is the inductance of the primary winding $N_P$ of the transformer $T_1$, $T_{ON}$ is an on-time of the PWM signal $V_{PWM}$ while the power switch $Q_1$ is switched on, and $T_S$ is the switching period of the PWM signal $V_{PWM}$.

From Equation (2), we find that the output power varies as the input voltage $V_{IN}$ varies. The input voltage $V_{IN}$ ranges between $90V_{AC}$ and $264V_{AC}$ when the safety regulations are taken into consideration, and wherein the power limit in a high line voltage is many times higher than the power limit in a low line voltage. There is a delay time $T_D$ from the moment when the voltage in current-sense signal $V_S$ is higher than the maximum threshold $V_M$ to the moment when the PWM signal $V_{PWM}$ is actually turned off. The maximum output power $P_O$ is also affected by the delay time $T_D$ of the control circuit. In the period of the delay time $T_D$, the power switch $Q_1$ is still turned on, and keeps on-state for delivering the output power. Therefore, the actual on-time of the PWM signal $V_{PWM}$ is equal to $T_{ON}+T_D$, and the actual maximum output power $P_O$ becomes as follows:

$$P_O = \frac{V_{IN}^2 \times (T_{ON} + T_D)^2}{2 \times L_P \times T_S} \qquad (3)$$

Although the delay time $T_D$ is short, generally within the range of 200 nsec~350 nsec, the higher the operating frequency and smaller the switching period $T_S$ become, the more influential impact is caused by the delay time $T_D$. Therefore, the input voltage $V_{IN}$ should be compensated properly, such that the input voltage $V_{IN}$ does not affect the maximum output power.

SUMMARY OF THE INVENTION

An objective of the present invention is to provide a power converter for compensating a maximum output power. A compensation circuit of the PWM controller can compensate a difference of the maximum output power caused by the input voltage and the delay time, and an identical maximum output power for the low line and high line voltage can be achieved.

In order to achieve the above and other objections, a PWM controller is provided according to the present invention. The PWM controller compensates a maximum output power of a power converter, and includes a PWM unit generating a PWM signal for controlling a power switch to switch a power transformer, wherein the power switch is coupled to a primary winding of the power transformer, the power transformer is supplied with an input voltage of the power converter, and a pulse width of the PWM signal is correlated to an amplitude of the input voltage; and a compensation circuit coupled between the PWM unit and a current-sense device for generating a current boost signal in response to the PWM signal and a current-sense signal, wherein the current-sense signal is generated by the current-sense device in response to a primary-side switching current of the transformer, the current boost signal is generated by pushing up a peak value of the current-sense signal, and a peak value of the current boost signal is adjusted by the pulse width of the PWM signal for compensating a difference of the maximum output power caused by the amplitude of the input voltage.

The power converter of the present invention compensates a maximum output power, and includes a power switch coupled to a primary winding of the power converter for switching a power transformer supplied with an input voltage of the power converter; a PWM unit generating a PWM signal for controlling a power switch, wherein a pulse width of the PWM signal is correlated to an amplitude of the input voltage;

a current-sense device generating a current-sense signal in response to a primary-side switching current of the power transformer; and a compensation circuit coupled between the PWM unit and the current-sense device for generating a current boost signal in response to the PWM signal and the current-sense signal, wherein the current boost signal is generated by pushing up a peak value of the current-sense signal, and a peak value of the current boost signal is adjusted by the pulse width of the PWM signal for compensating a difference of the maximum output power caused by the amplitude of the input voltage.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
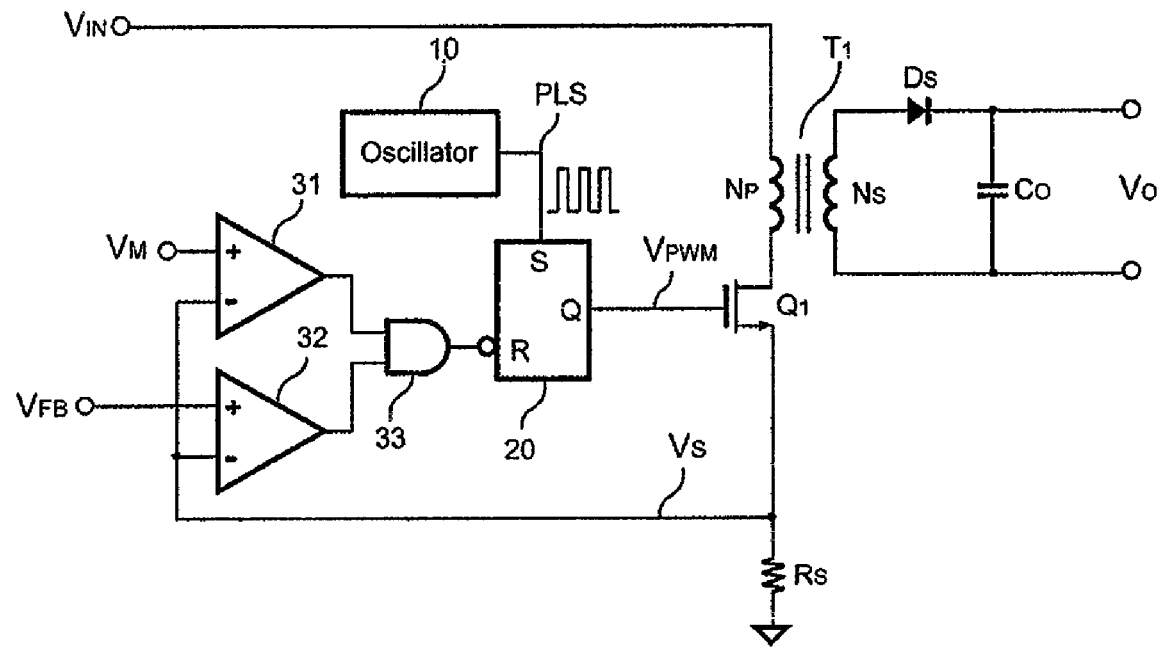
FIG. 1 shows a traditional power converter.
Figure 2:
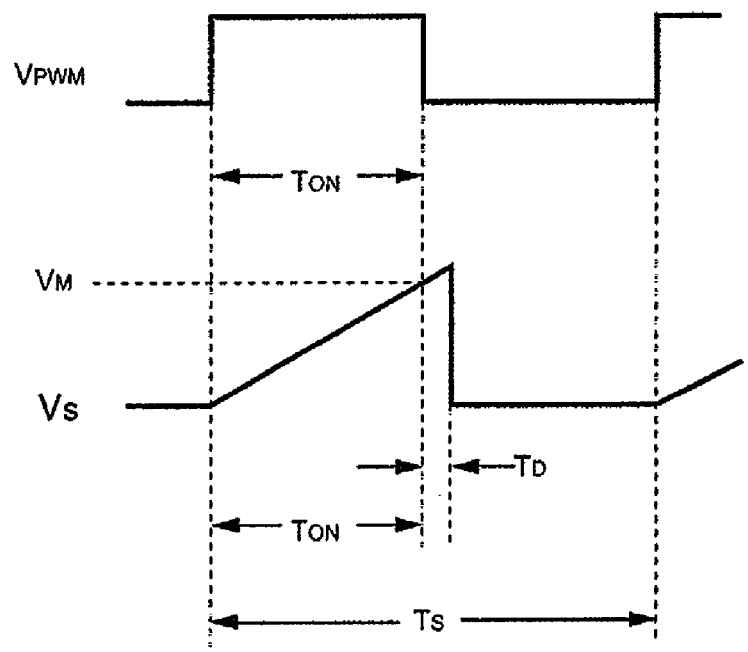
FIG. 2 shows the signal waveforms of the PWM signal and the current signal of the traditional power converter shown in FIG. 1.
Figure 3:
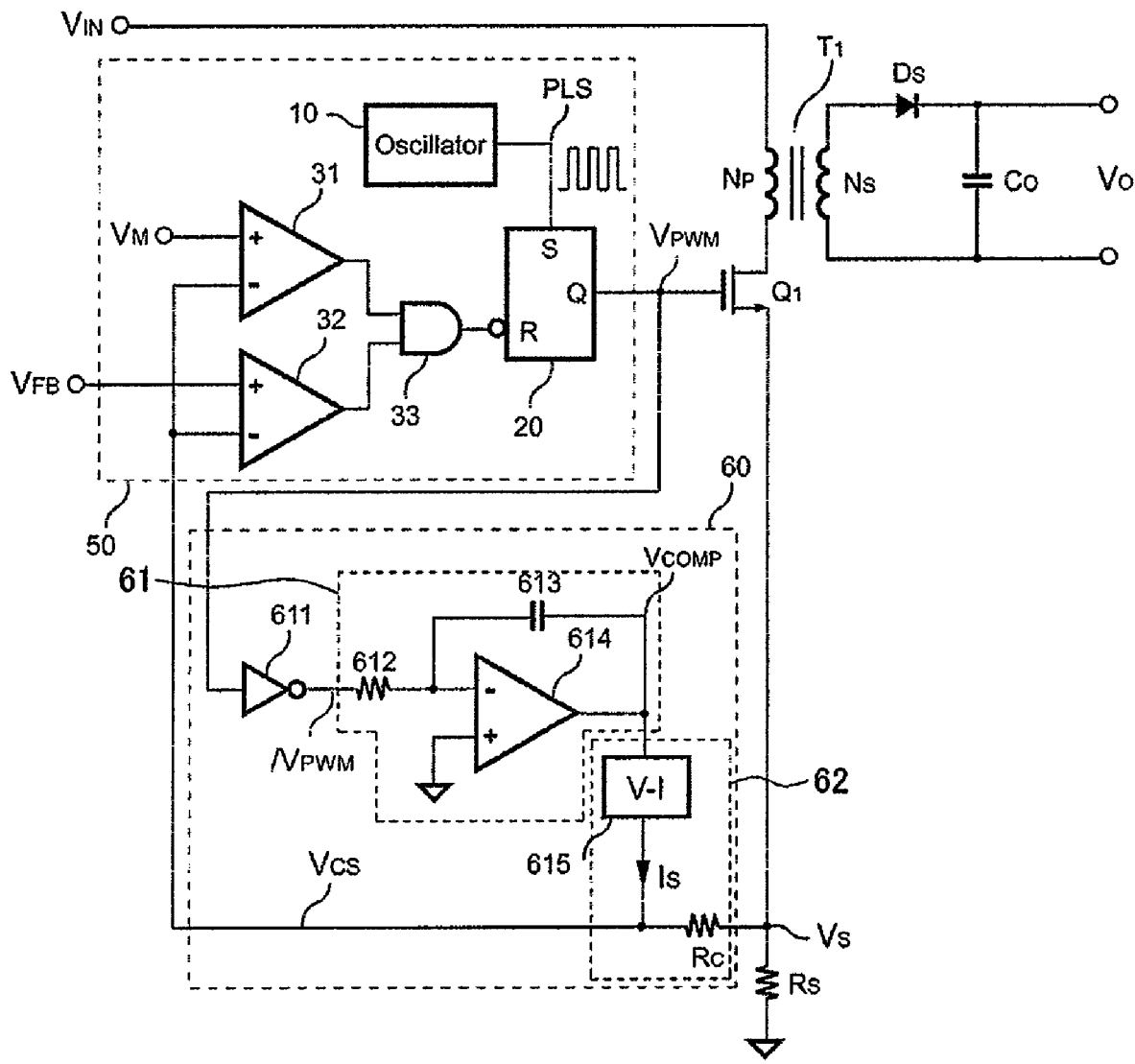
FIG. 3 shows a power converter having a PWM controller in accordance with the present invention.

Referring to FIG. 3, which is a circuit diagram of a power converter according to a first embodiment of the invention. The power converter includes a power transformer $T_1$ having a primary winding $N_P$ and a secondary winding $N_S$. The power transformer $T_1$ transfers the stored energy from the primary winding $N_P$ to the secondary winding $N_S$. The primary winding $N_P$ is supplied with an input voltage $V_{IN}$ of the power converter. In order to regulate an output voltage $V_O$ of the power converter, a PWM controller is coupled in series with the primary winding $N_P$ of the power transformer $T_1$ to generate a PWM signal $V_{PWM}$ in response to a feedback signal $V_{FB}$.

In the first embodiment, the PWM controller comprises a PWM unit 50 and a compensation circuit 60, wherein the PWM unit 50 comprises an oscillator 10, a flip-flop 20, comparators 31, 32 and a logic circuit 33. The oscillator 10 generates a pulse signal PLS to the flip-flop 20. The flip-flop 20 generates the PWM signal $V_{PWM}$ in response to the pulse signal PLS and an output terminal of the logic circuit 33. The PWM signal $V_{PWM}$ controls a power switch $Q_1$ to switch the power transformer $T_1$. The power switch $Q_1$ is coupled to the primary winding $N_P$ of the power transformer $T_1$ of the power converter, and the power transformer $T_1$ is supplied with an input voltage $V_{IN}$ of the power converter. In general, the input voltage $V_{IN}$ ranges between $90V_{AC}$ and $264V_{AC}$ when the safety regulations are taken into consideration, and wherein the maximum output power in a high line voltage is many times higher than the maximum output power in a low line voltage. A pulse width of the PWM signal $V_{PWM}$ is correlated to an amplitude of the input voltage $V_{IN}$. Therefore, The pulse width of the PWM signal $V_{PWM}$ is decreased in response to the increase of the input voltage $V_{IN}$, and the pulse width of the PWM signal $V_{PWM}$ is increased in response to the decrease of the input voltage $V_{IN}$.

The compensation circuit 60 is coupled between the PWM unit 50 and a current-sense device $R_S$ for generating a current boost signal $V_{CS}$ in response to the PWM signal $V_{PWM}$ and a current-sense signal $V_S$. The current-sense device $R_S$ is connected in series with the power switch $Q_1$ to transform a primary-side switching current of the power transformer $T_1$ to the current-sense signal $V_S$ and to determine the maximum output power of the power converter. The current boost signal $V_{CS}$ is generated by push up a peak value of the current-sense signal $V_S$, and a peak value of the current boost signal $V_{CS}$ is adjusted by the pulse width of the PWM signal $V_{PWM}$ for compensating a difference of the maximum output power caused by the amplitude of the input voltage.

The peak value of the current-sense signal $V_S$ is pushed up by the compensation circuit 60 for generating the current boost signal $V_{CS}$ in response to the pulse width of the PWM signal $V_{PWM}$. If the current boost signal $V_{CS}$ is greater than a maximum predetermined threshold $V_M$ through the comparators 31 or the feedback signal $V_{FB}$ through the comparator 32, the PWM controller disables the PWM signal $V_{PWM}$, and it also restricts the maximum output power of the power converter.

The compensation circuit 60 comprises an inverting circuit 611, an integrated circuit 61 and a boost circuit 62. The integrated circuit 61 is composed of a resistor 612, an amplifier 614 and a capacitor 613. A negative terminal of the amplifier 614 is coupled to the inverting circuit 611 for integrating an inverted PWM signal $/V_{PWM}$ to a compensation signal $V_{COMP}$. The inverted PWM signal $/V_{PWM}$ is generated in accordance with the PWM signal $V_{PWM}$ through the inverting circuit 611. The compensation signal $V_{COMP}$ has a DC level proportional to a pulse width of the inverted PWM signal $/V_{PWM}$. The boost circuit 62 comprises a voltage-to-current converter 615 and a boost device $R_C$. The voltage-to-current converter 615 is coupled to the integrated circuit 61 for converting the compensation signal $V_{COMP}$ into a corresponding current signal $I_S$. The boost device $R_C$ is coupled between the voltage-to-current converter 615 and the current-sense device $R_S$ for generating the current boost signal $V_{CS}$ in response to the current signal $I_S$ and the current-sense signal $V_S$. The boost device $R_C$ is formed by a resistor.

Figure 4:
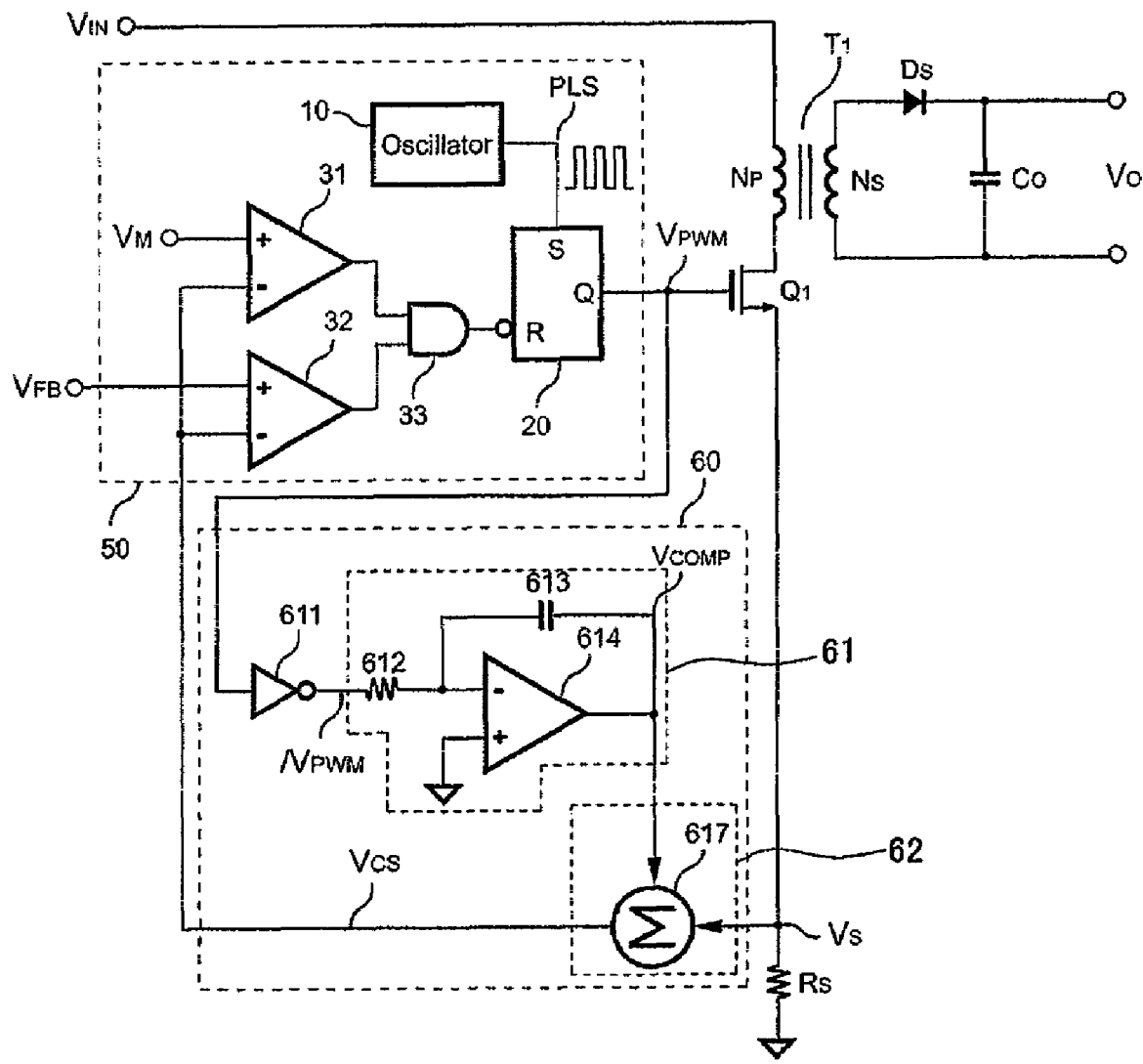
FIG. 4 shows a second embodiment of the boost circuit in accordance with the present invention.

FIG. 4 shows a second embodiment of the boost circuit 62 according to the invention, the boost circuit 62 includes an adder 617. The adder 617 is coupled between the integrated circuit 61 and the current-sense device $R_S$ for generating the current boost signal $V_{CS}$ in response to the compensation signal $V_{COMP}$ and the current-sense signal $V_S$.

Figure 5:
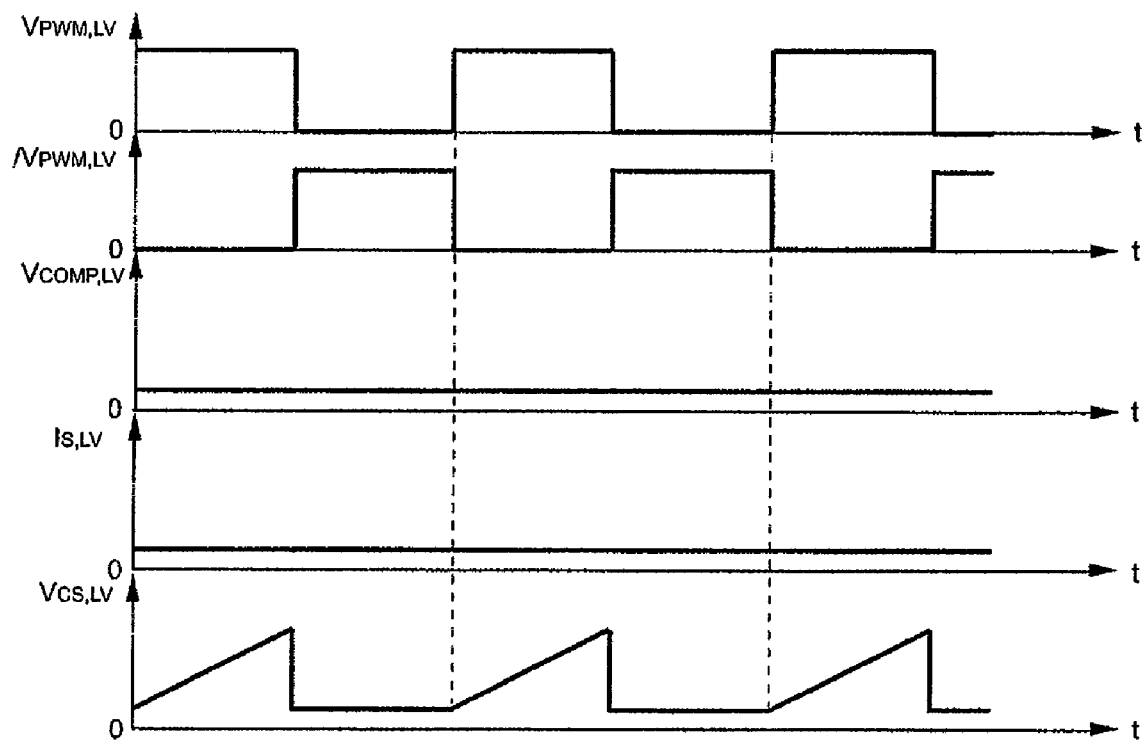
FIG. 5 shows the waveforms of the PWM controller in the low line voltage according to the present invention.

FIG. 5 shows the waveforms of the PWM controller in the low line voltage according to the present invention. Referring to FIG. 3 and FIG. 4 together, The PWM signal $V_{PWM,LV}$ will be first inverted to the inverted PWM signal $/V_{PWM,LV}$ through the inverting circuit 611. The inverted PWM signal $/V_{PWM,LV}$ will then be integrated to the corresponding compensation signal $V_{COMP,LV}$ by the integrated circuit 61. Thereafter, the compensation signal $V_{COMP,LV}$ is transformed to the corresponding current signal $I_{S,LV}$ through the voltage-to-current converter 615, and then transformed to an voltage signal by the boost device $R_C$, as shown in FIG. 3, for pushing up the peak value of the current-sense signal $V_S$ to the current boost signal $V_{CS,LV}$. In other words, the current boost signal $V_{CS}$ is equal to the compensation signal $V_{COMP}$ plus the current-sense signal $V_S$.

Figure 6:
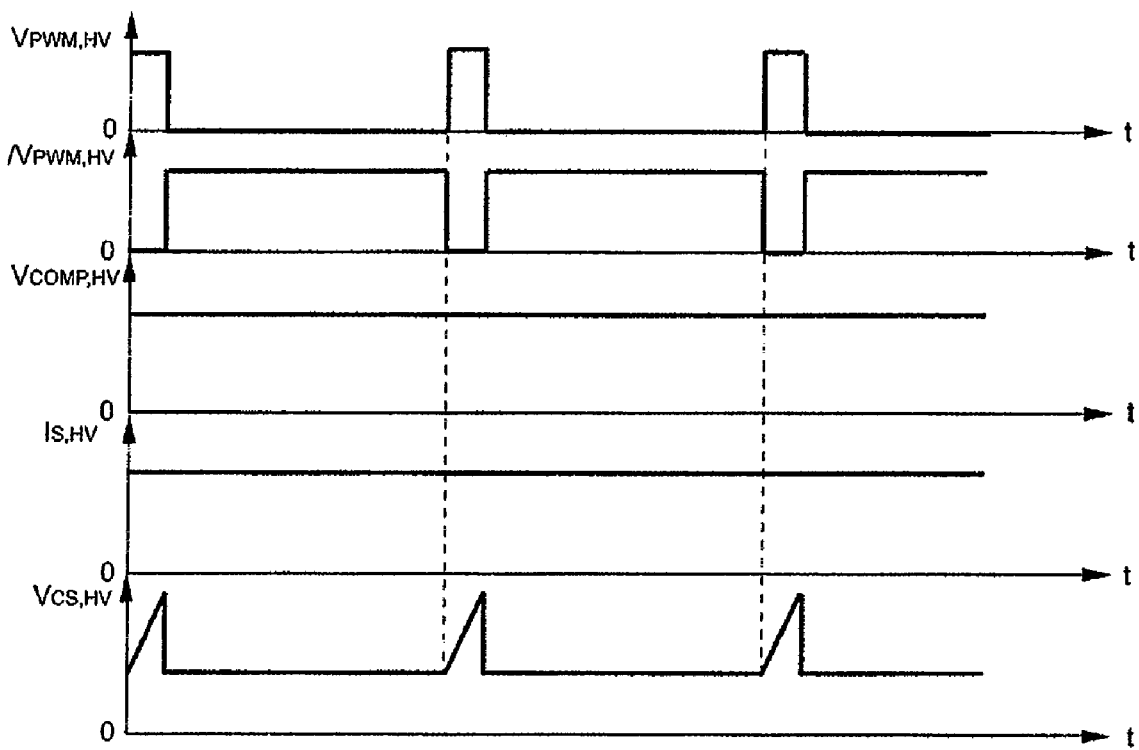
FIG. 6 the waveforms of the PWM controller in the high line voltage according to the present invention.

FIG. 6 shows the waveforms of the PWM controller in the high line voltage according to the present invention. Referring to FIG. 3 and FIG. 4 together, the PWM signal $V_{PWM,HV}$ will be inverted to the inverted PWM signal $/V_{PWM,HV}$ through the inverting circuit 611. The inverted PWM signal $/V_{PWM,HV}$ will then be integrated to the corresponding compensation signal $V_{COMP,HV}$ by the integrated circuit 61. Thereafter, the compensation signal $V_{COMP,HV}$ is transformed to the corresponding current signal $I_{S,HV}$ through the voltage-to-current converter 615, and then transformed to an voltage signal by the boost device $R_C$, as shown in FIG. 3, for pushing up the peak value of the current-sense signal $V_S$ to the current boost signal $V_{CS,HV}$. As mention above, the current boost signal $V_{CS}$ is equal to the compensation signal $V_{COMP}$ plus the current-sense signal $V_S$.

Comparing FIG. 5 and FIG. 6, the pulse-width of the PWM signal $V_{PWM,LV}$ in the low line voltage is longer than the pulse-width of the PWM signal $V_{PWM,HV}$ in the high line voltage. After the PWM signal $V_{PWM}$ being inverted, the pulse-width of the inverted PWM signal $/V_{PWM,LV}$ in the low line voltage is shorter than the pulse-width of the inverted PWM signal $/V_{PWM,HV}$ in the high line voltage. After the inverted PWM signal $/V_{PWM}$ being integrated, the compensation signal $V_{COMP,LV}$ in the low line voltage is lower than the compensation signal $V_{COMP,HV}$ in the high line voltage, and the current signal $I_{S,LV}$ is also lower than the current signal $I_{S,HV}$. Therefore, the peak value of the current boost signal $V_{CS,LV}$ in the low line voltage is smaller than the current boost signal $V_{CS,HV}$ in the high line voltage. In other words, the output power limit of the high line voltage is lower than the output power limit of the low line voltage. From the above description, the input voltage $V_{IN}$ should be compensated properly, such that the variation of the input voltage $V_{IN}$ does not affect the maximum output power. The compensation circuit 60 of the PWM controller can compensate the difference of the maximum output power caused by the input voltage $V_{IN}$ and the delay time, an identical maximum output power for the low line and high line voltage can be achieved.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A PWM controller for compensating a maximum output power of a power converter, comprising:
   a PWM unit for generating a PWM signal for controlling a power switch to switch a power transformer, wherein the power switch is coupled to a primary winding of the power converter, the power transformer is supplied with an input voltage of the power converter, and a pulse width of the PWM signal is correlated to an amplitude of the input voltage; and
   a compensation circuit coupled between the PWM unit and a current-sense device for generating a current boost signal in response to the PWM signal and a current-sense signal, wherein the current-sense signal is generated by the current-sense device in response to a primary-side switching current of the power transformer, the current boost signal is generated by pushing up a peak value of the current-sense signal, and a peak value of the current boost signal is adjusted by the pulse width of the PWM signal for compensating a difference of the maximum output power caused by the amplitude of the input voltage.

2. The PWM controller of claim 1, wherein the compensation circuit comprises:
   an integrated circuit for generating an compensation signal for integrating an inverted PWM signal from the PWM unit, wherein the inverted PWM signal is generated in response to the PWM signal through an inverting circuit, and the compensation signal has a DC level proportional to a pulse width of the inverted PWM signal; and
   a boost circuit coupled between the integrated circuit and the current-sense device to push up the current-sense signal for generating the current boost signal, wherein the current boost signal is equal to the compensation signal plus the current-sense signal.

3. The PWM controller of claim 2, wherein the boost circuit comprises:
   a voltage-to-current converter coupled to the integrated circuit for converting the compensation signal into a current signal; and
   a boost device coupled between the voltage-to-current converter and the current-sense device for generating the current boost signal in response to the current signal and the current-sense signal.

4. The PWM controller of claim 3, wherein the boost device comprises a resistor.

5. The PWM controller of claim 2, wherein the boost circuit comprises an adder coupled between the integrated circuit and the current-sense device for generating the current boost signal in response to the compensation signal and the current-sense signal.

6. The PWM controller of claim 1, wherein the pulse-width of the PWM signal is decreased in response to an increase of the input voltage, and the pulse-width of the PWM signal is increased in response to a decrease of the input voltage.

7. A power converter for compensating a maximum output power, comprising:
   a power switch coupled to a primary winding of the power converter for switching a power transformer supplied with an input voltage of the power converter;
   a PWM unit for generating a PWM signal for controlling a power switch, wherein a pulse width of the PWM signal is correlated to an amplitude of the input voltage;
   a current-sense device for generating a current-sense signal in response to a primary-side switching current of the power transformer; and
   a compensation circuit coupled between the PWM unit and the current-sense device for generating a current boost signal in response to the PWM signal and the current-sense signal, wherein the current boost signal is generated by pushing up a peak value of the current-sense signal, and a peak value of the current boost signal is adjusted by the pulse width of the PWM signal for compensating a difference of the maximum output power caused by the amplitude of the input voltage.

8. The power converter of claim 7, wherein the compensation circuit comprises:
   an integrated circuit for generating an compensation signal for integrating an inverted PWM signal from the PWM unit, wherein the inverted PWM signal is generated in response to the PWM signal through an inverting circuit, and the compensation signal has a DC level proportional to a pulse width of the inverted PWM signal; and
   a boost circuit coupled between the integrated circuit and the current-sense device to push up the current-sense signal for generating the current boost signal, wherein the current boost signal is equal to the compensation signal plus the current-sense signal.

9. The power converter of claim 8, wherein the boost circuit comprises:
   a voltage-to-current converter coupled to the integrated circuit for converting the compensation signal into a current signal; and
   a boost device coupled between the voltage-to-current converter and current-sense device for generating the current boost signal in response to the current signal and the current-sense signal.

10. The power converter of claim 9, wherein the boost device comprises a resistor.

11. The power converter of claim 8, wherein the boost circuit comprises an adder coupled between the integrated circuit and the current-sense device for generating the current boost signal in response to the compensation signal and the current-sense signal.

12. The PWM controller of claim 7, wherein the pulse-width of the PWM signal is decreased in response to an increase of the input voltage, and the pulse-width of the PWM signal is increased in response to a decrease of the input voltage.

* * * * *